United States Patent
Baldemair et al.

(10) Patent No.: US 8,068,458 B2
(45) Date of Patent: Nov. 29, 2011

(54) RANDOM ACCESS PREAMBLE SELECTION

(75) Inventors: Robert Baldemair, Solna (SE); Muhammad Kazmi, Bromma (SE)

(73) Assignee: Telefonaktiebolaget L M Ericson (publ), Stockholm (SE)

( * ) Notice: Subject to any disclaimer, the term of this patent is extended or adjusted under 35 U.S.C. 154(b) by 466 days.

(21) Appl. No.: 12/369,326

(22) Filed: Feb. 11, 2009

(65) Prior Publication Data
US 2010/0046425 A1    Feb. 25, 2010

Related U.S. Application Data
(60) Provisional application No. 61/089,979, filed on Aug. 19, 2008.

(51) Int. Cl.
*H04W 4/00* (2009.01)
*H04W 74/00* (2009.01)
*H04J 3/06* (2006.01)

(52) U.S. Cl. ........ 370/329; 370/341; 370/350; 455/434; 455/450

(58) Field of Classification Search .................. None
See application file for complete search history.

(56) References Cited

U.S. PATENT DOCUMENTS
| | | | |
|---|---|---|---|
| 7,076,002 B1 * | 7/2006 | Ramirez-Mireles et al. | 375/316 |
| 7,646,703 B2 * | 1/2010 | Trachewsky et al. | 370/208 |
| 2008/0101313 A1 * | 5/2008 | Choi et al. | 370/342 |
| 2008/0175159 A1 * | 7/2008 | Caveney et al. | 370/248 |
| 2008/0225785 A1 * | 9/2008 | Wang et al. | 370/329 |
| 2008/0267134 A1 * | 10/2008 | Cheng et al. | 370/335 |
| 2008/0318567 A1 * | 12/2008 | Popovic et al. | 455/422.1 |
| 2009/0046573 A1 * | 2/2009 | Damnjanovic | 370/216 |
| 2009/0046629 A1 * | 2/2009 | Jiang et al. | 370/328 |
| 2009/0046691 A1 * | 2/2009 | Karjalainen et al. | 370/342 |
| 2009/0285337 A1 * | 11/2009 | Cheng et al. | 375/343 |

OTHER PUBLICATIONS

Fujitsu, "Maximum Power Reduction of RACH Preamble", R4-081824, 3GPP TSG-RAN WG4 Meeting #48, Jeju, Korea, Aug. 18-22, 2008, 2 pages.

Fujitsu, "Maximum Power Reduction of RACH Preamble", R4-081825, 3GPP TSG-RAN WG4 (Radio) Meeting #48, Jeju, Korea, Jun. 18-22, 2008, 2 pages.

* cited by examiner

*Primary Examiner* — Chi Pham
*Assistant Examiner* — Soon-Dong Hyun
(74) *Attorney, Agent, or Firm* — Rothwell, Figg, Ernst & Manbeck, P.C.

(57) ABSTRACT

The present invention relates to methods for establishing a connection between a user equipment and a wireless network. More particularly, the present invention relates to methods for selecting a preamble based on its power back-off metric in order to randomly access a wireless network while avoiding collisions with other user equipments attempting to access the network at the same time.

23 Claims, 6 Drawing Sheets

RANDOM ACCESS PREAMBLE SELECTION

This application claims the benefit of U.S. Provisional Patent Application No. 61/089,979, filed on Aug. 19, 2008, which is incorporated herein by this reference.

TECHNICAL FIELD

The present invention relates to methods of randomly accessing wireless communication networks.

BACKGROUND

Mobile communication systems enable a mobile terminal (a.k.a., user equipment (UE)) to access a network via a network node (e.g., a base station). In some systems, before the UE begins transmitting traffic to the network via the network node, the UE performs a random access (RA) procedure to request access to the network. For example, the UE transmits an access burst to the network node using a random access channel.

To distinguish between different UEs performing RA, the access burst transmitted by the UE contains a preamble randomly chosen by the UE that the network node may use to identify the UE. Generally, the UE will uniformly, randomly select a preamble from a set of preambles (e.g., 64 preambles) that was derived from one or more root sequences (e.g., Zadoff-Chu sequences) associated with the network node.

A set of one or more preambles may be derived from a root sequence by cyclic shifting of the root sequence. The number of preambles that can be derived from a root sequence depends on the maximum expected round trip time between the UE and the network node. For instance, if a root sequence had a length of 800 μs and a very short maximum expected round trip time, then 64 preambles could be derived from the root sequence if the cyclic shift length was less than or equal to 800/64 μs, or 12.5 μs. The maximum expected round trip time is not always short. Indeed, sometimes it may be rather large. Because the cyclic shift length must be large enough to avoid any ambiguity in preamble detection due to propagation round trip time, in some instances, multiple root sequences (e.g., 64 root sequences) are required to generate 64 unique preambles.

According to some standards, a number of root sequences are available to derive the preambles. For instance, according to the 3G Long-Term Evolution (LTE) standard, a total of 838 root sequences are available for use. Each network node in the network is typically associated with a subset of the 838 root sequences. While different nodes may have the same root sequences associated with them, it is generally advisable to assign different root sequences to nodes that are physically near each other to avoid ambiguity.

Not all root sequences have the same properties. For instance, different root sequences can have different power back-off metrics (PBM) (e.g., different cubic metric (CM), peak-to-average power ratio, out-of-band emissions, etc.). All preambles derived from a particular root sequence inherit the PBM properties of the particular root sequence. While it may be desirable for a UE to select a preamble having the "best" PBM characteristics when randomly accessing a network node, all UEs should not use the preamble with the best PBM characteristics because this would result in an increase in collisions. Thus, there exists a need in the art for a method of selecting a preamble with desirable PBM characteristics while at the same time not exacerbating the collision problem.

SUMMARY

In one aspect the present invention provides a method performed by a UE for randomly accessing a network node. In some embodiments, the method includes the following steps: (A) receiving from the network node sequence information for defining a set of sequences (e.g., a sequence index and a cyclic shift length where the sequence index is specific to a set of one or more network nodes of which the network node is a member), where each sequence in the set is associated with a power back-off metric (e.g., a cubic metric, a peak to average power ratio, or an out of band emission related metric); (B) selecting a sequence from the set of sequences; and (C) using the selected sequence or a sequence derived from the selected sequence to access the network node, wherein the step of selecting a sequence from the set of sequences comprises randomly selecting a sequence from the set of sequences using a non-uniform selection process such that the probability that a particular sequence is selected is a function of the power back-off metric associated with the particular sequence.

In some embodiments, the step of using the selected sequence or the sequence derived from the selected sequence to access the network node comprises transmitting to the network node the selected sequence or a preamble derived from the selected sequence.

In some embodiments, the step of selecting a sequence from the set of sequences comprises randomly selecting a sequence from the set of sequences using a non-uniform selection process such that the probability that a particular sequence is selected is a function of (i) the power back-off metric associated with the particular sequence and (ii) a value representing an amount of path loss experienced by the UE, such that if the value representing the amount of path loss experienced by the UE is greater than a threshold the non-uniform selection process favors certain sequences from the set, and if the value representing the amount of path loss experienced by the UE is less than a threshold the non-uniform selection process favors other sequences from the set of sequences wherein each other sequence is associated with a power back-off metric that is higher than the average or median power back-off metric of said certain sequences.

In some embodiments, the step of randomly selecting a sequence from the set of sequences using a non-uniform selection process is performed only if one or more certain events are detected. The one or more certain events may include a path loss exceeding a threshold, the receipt of a hand off command, the UE being located at a cell edge, and/or the nth successive failure of a random access attempt, where n>1. In some embodiments, the method also includes receiving a path loss threshold transmitted from the network node, wherein the one or more certain events comprises determining that a measured path loss exceeds the path loss threshold.

In some embodiments, the step of selecting a sequence from the set of sequences comprises randomly selecting a sequence from the set of sequences using a non-uniform selection process that favors certain sequences from the set of sequences, wherein each of said certain sequences is associated with a power back-off metric that is lower than an average or median power-back off metric for the set of sequences.

In some embodiments, the step of randomly selecting a sequence from the set of sequences using a non-uniform selection process comprises: forming a second set of sequences; and randomly selecting a sequence from only the second set of sequences. The step of forming the second set of sequences may include: for each sequence included in the first recited set of sequences, determining whether the sequence should be added to the second set of sequences, wherein the determination is based on, at least in part, the power back-off metric associated with the sequence, and adding the sequence to the second set of sequences in response to determining that the sequence should be added to the second set of sequences.

In some embodiments, the step of determining whether the sequence should be added to the second set of sequences comprises determining whether the power back-off metric associated with the sequence is below a threshold, wherein if the power back-off metric associated with the sequence is below the threshold, then the sequence should be added to the second set of sequences such that the second set of sequences contains only those sequences that are associated with a power back-off metric that is relatively small.

In some embodiments, the step of randomly selecting a sequence from the second set of sequences is performed such that each sequence in the second set of sequences has an equal probability of being randomly selected.

In some embodiments, the set of sequences is a set of root sequences, and the UE stores a set of power back-off metrics, wherein each power back-off metric is associated with a root sequence.

In another aspect, the present invention provides an improved communication device. In some embodiment, the improved communication device includes a receiver operable to receive sequence information; a data processing system configured to define a set of sequences, where each sequence in the set is associated with a power back-off metric, and select a sequence from the set of sequences; and a transmitter operable to transmit to a network node the selected sequence or a sequence derived from the selected sequence, wherein the data processing system is operable to randomly select a sequence from the set of sequences using a non-uniform selection process such that the probability that a particular sequence is selected is a function of the power back-off metric associated with the particular sequence.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements

DETAILED DESCRIPTION

Figure 1:
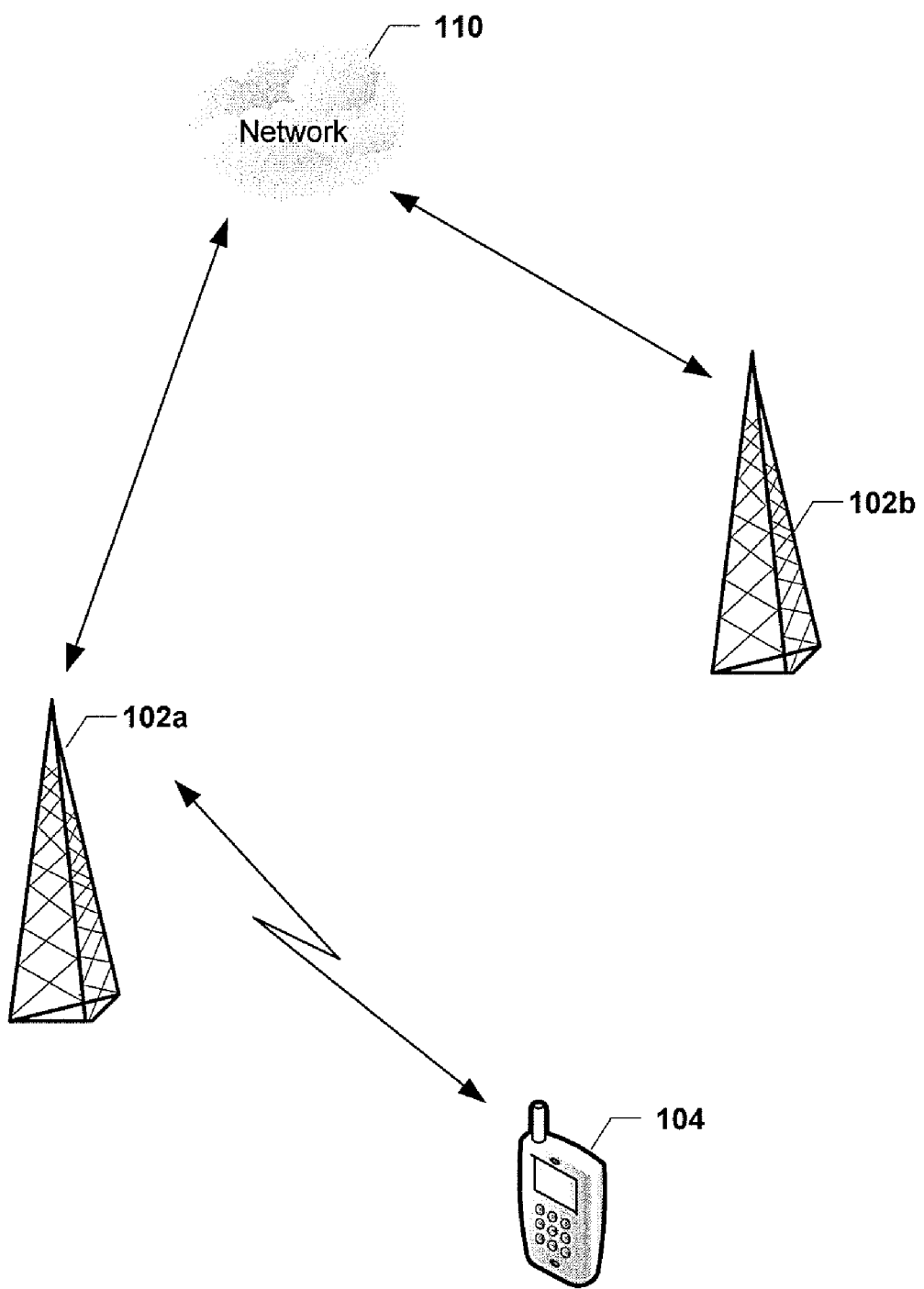
FIG. 1 illustrates a portion of a mobile communication system.

Referring now to FIG. 1, FIG. 1 illustrates a portion of a mobile communication system 100. As depicted in FIG. 1, mobile communication system 100 may comprise a plurality of network nodes 102a, 102b (e.g., base stations) for enabling a mobile terminal 104 (a.k.a., user equipment (UE) 104) to access network 110.

As described above, in some communication systems, UE 104 must transmit to a network node 102 a request to access network 110 prior to transmitting traffic to network 110. This request may be transmitted as an access burst on a random access channel (e.g., a Physical Random Access Channel (PRACH)). As also discussed above, when UE 104 transmits a message (e.g., an access burst) to a network node 102 using the random access channel, UE 104 should select a preamble to include in the message. As further discussed above, it would be advantageous if UE 104 can intelligently select a preamble without significantly increasing the likelihood of a preamble collision.

Figure 2:
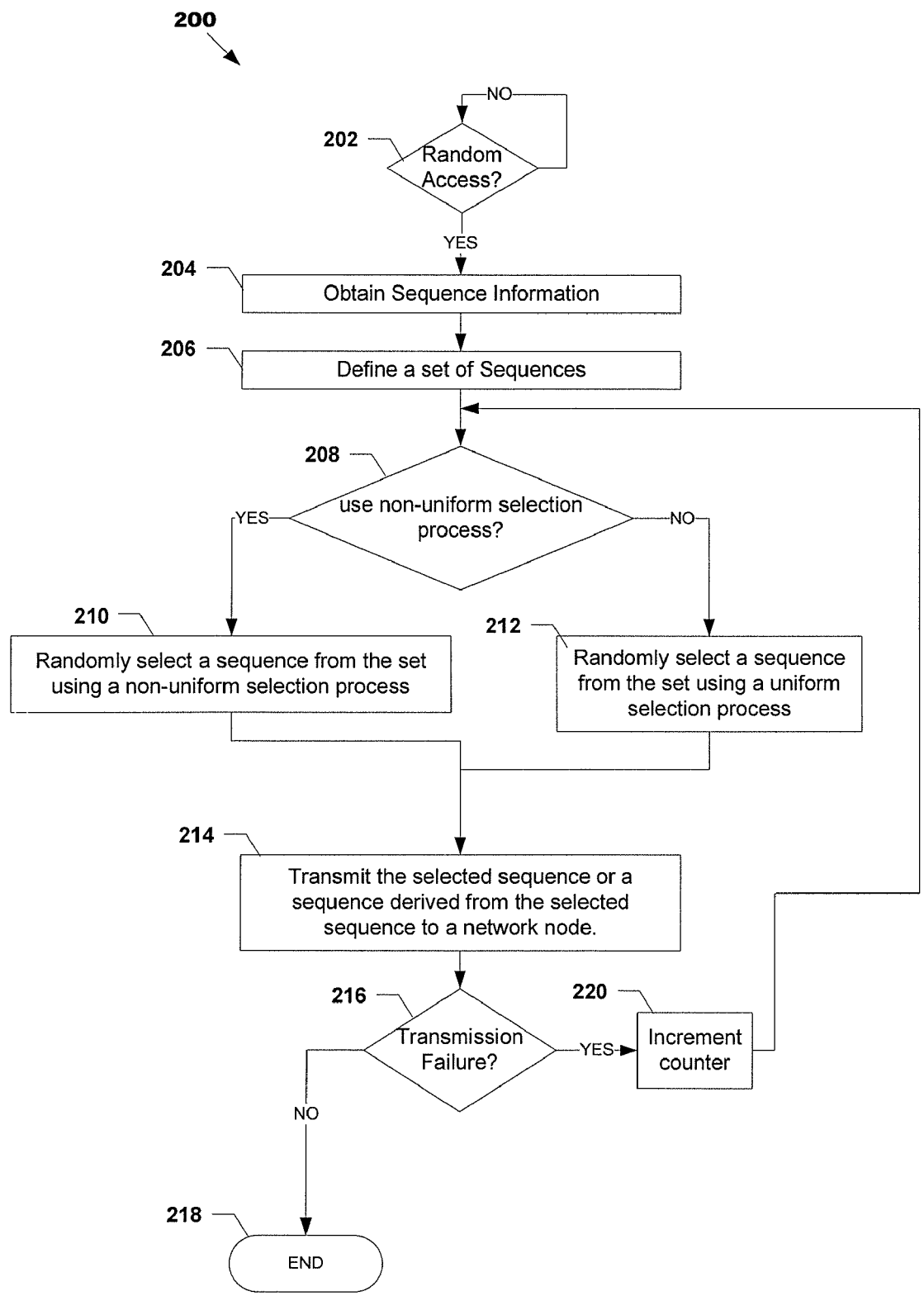
FIG. 2 is a flowchart depicting a method for randomly accessing a wireless network according to embodiments of the present invention.

Referring now to FIG. 2, FIG. 2 is a flow chart illustrating a process 200, according to some embodiments, performed by UE 104 for randomly accessing a network node 102.

Process 200 may begin in step 202, where UE 104 determines whether it needs to randomly access a network node 102. If it does, the process proceeds to step 204, otherwise process 202 may be repeated again.

In step 204, UE 104 obtains sequence information. For example, in step 202 UE 104 may receive the sequence information from a network node 102. In some systems, each network node periodically broadcasts sequence information. For example, in some systems, each network node broadcasts a logical sequence index and a cyclic shift length. Additionally, in some systems (e.g., LTE) a high speed flag is also transmitted.

In step 206, UE 104 uses the received sequence information to define a set of sequences. For example, in some embodiments, the set of defined sequences may consist of all of the root sequences that correspond to the received sequence information. In other embodiments, the set of defined sequences may consist of sixty four (64) preambles, where each preamble was derived from a root sequence included in the set of root sequences that correspond to the received sequence information. For instance, if the set of root sequences that correspond to the received sequence information consists of a single root sequence, then each of the 64 preambles are derived from that one root sequence. As another example, if the set of root sequences that correspond to the received sequence information consists of 64 root sequences, then each of the 64 preambles is derived from a different one of the root sequences.

In step 208, UE 104 determines whether it should use a non-uniform or uniform selection process to select a sequence from the set of sequences (e.g., UE 104 determines whether it should select a sequence with a low power back-off metric or a high power back-off metric). Process 200 proceeds to step 210 if UE 104 determines it should use a non-uniform selection process, otherwise it proceeds to step 212.

In step 210, UE 104 randomly selects a sequence from the set of sequences defined in step 206 using a non-uniform selection process. In some circumstances, in step 210, UE 104 randomly selects a sequence from the set of sequences defined in step 206 using a non-uniform selection process that favors sequences having a low power back-off metric. For example, if UE 104 determines that it is at a cell edge or has a high path loss, then UE 104 will select a sequence from the set of sequences using a selection process that favors sequences having a low power back-off metric (e.g., sequences associated with a power back-off metric that is lower than the average or median power back-off metric associated with the set of sequences).

In other circumstances, in step 210, UE 104 randomly selects a sequence from the set of sequences defined in step 206 using a non-uniform selection process that favors sequences having a high power back-off metric. For example, if UE 104 determines that it is not at a cell edge or does not have a high path loss, then UE 104 may select a sequence from the set of sequences using a selection process that favors sequences having a high power back-off metric (e.g., sequences associated with a power back-off metric that is higher than the average or median power back-off metric associated with the set of sequences).

In step 212, UE 104 randomly selects a sequence from the set of sequences defined in step 206 using a uniform selection process such that no sequences are favored in the selection process.

In step 214, UE 104 transmits to the network node from which UE 104 received the sequence information a message containing the selected sequence (i.e., the selected preamble or a preamble derived from the selected root sequence depending on whether the set of sequences consists of preambles or root sequences).

In step 216, UE 102 determines whether there was a transmission failure (e.g., whether the network node to which the message was transmitted successfully received the message). If there was no transmission failure, process 200 may end (or return back to step 202). If there was a transmission failure, process 200 proceeds to step 220.

In step 220 a counter that keeps track of the number of transmission failures is incremented (this counter may have been initialized to zero prior to performing step 214).

Figure 3:
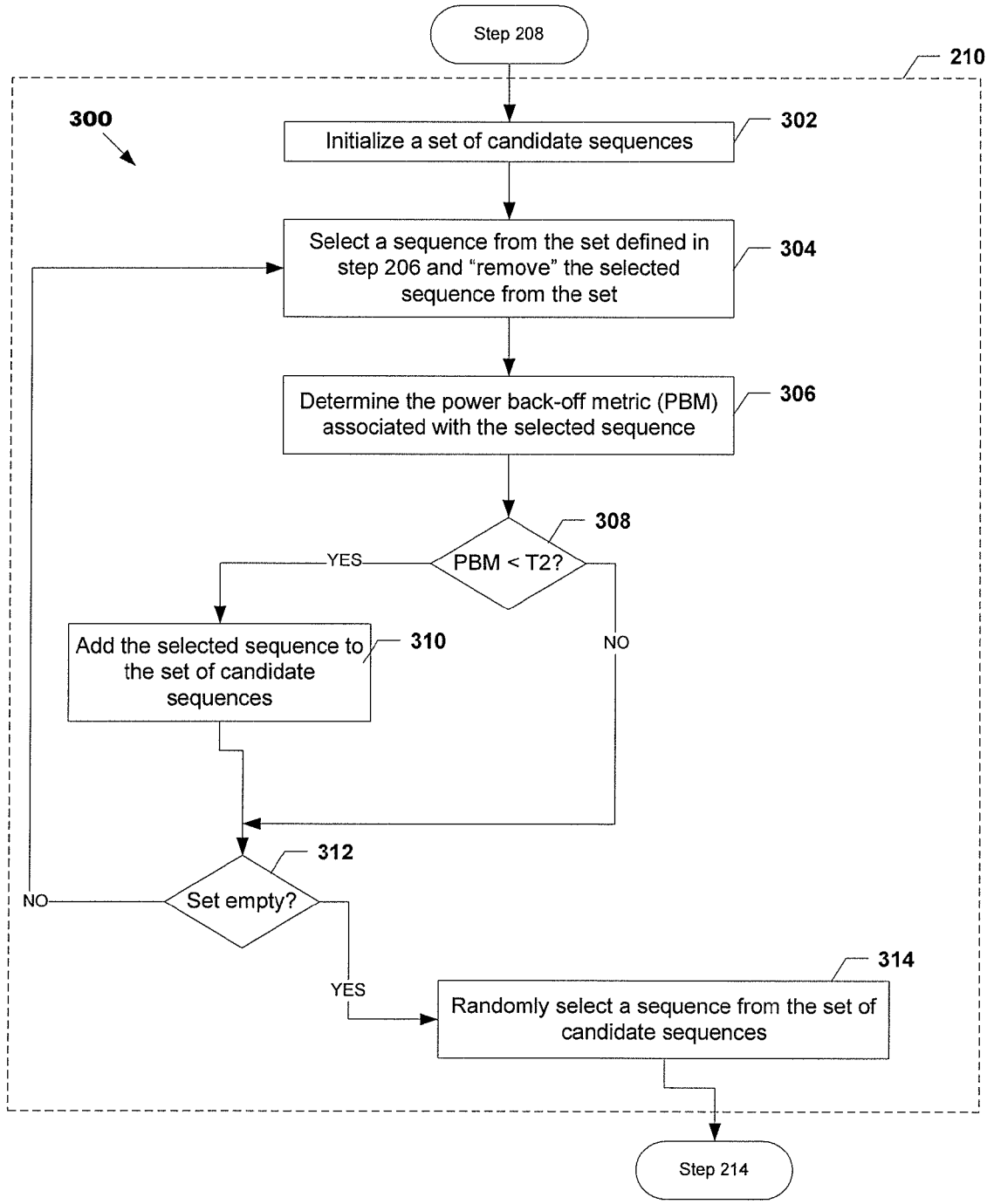
FIG. 3 is a flowchart depicting a method of randomly selecting a sequence from a set of sequences using a non-uniform selection process according to embodiments of the present invention.

Referring now to FIG. 3, FIG. 3 is a flow chart illustrating an exemplary process 300 for performing step 210. Process 300 may begin in step 302 where a set of candidate sequences is initialized. A sequence is then selected from the set defined in step 206 and "removed" from the set (step 304). A sequence may be "removed" from the set by, for example, setting a flag indicating that the sequence has been selected.

At step 306, the power back-off metric (PBM) associated with the selected sequence is determined. If the PBM of the selected sequence is identified as being below a certain predefined threshold value (T2) at step 308, then the selected sequence is added to the set of candidate sequences (step 310), otherwise process 300 proceeds to step 312. In step 312, UE 104 determines whether the set of sequences defined in step 206 is "empty" (i.e., whether all of the sequences in the set have been selected). If the set is not empty, the process loops back to step 304. If, the set is empty, then a sequence can be randomly selected from the set of candidate sequences using, for example, a uniform selection process (step 314). In this manner, UE 104 randomly selects a sequence from the set of sequences defined in step 206 using a non-uniform selection process that favors sequences having a lower power back-off metric.

Process 300 is an example process for performing step 210. Other processes for performing step 210 are contemplated. For example, step 210 may be implemented by randomly selecting a sequence from the set defined in step 206 such that the probability that a particular sequence is selected is a function of the PBM associated with the sequence (e.g., sequences with a low PBM may be weighted more heavily in the selection process than sequences that do not have a low PBM such that the sequences with a low PBM are selected more of the time than sequences with high PBM). Additionally, the probability that a particular sequence is selected may also be function of a value representing an amount of path loss.

Figure 4:
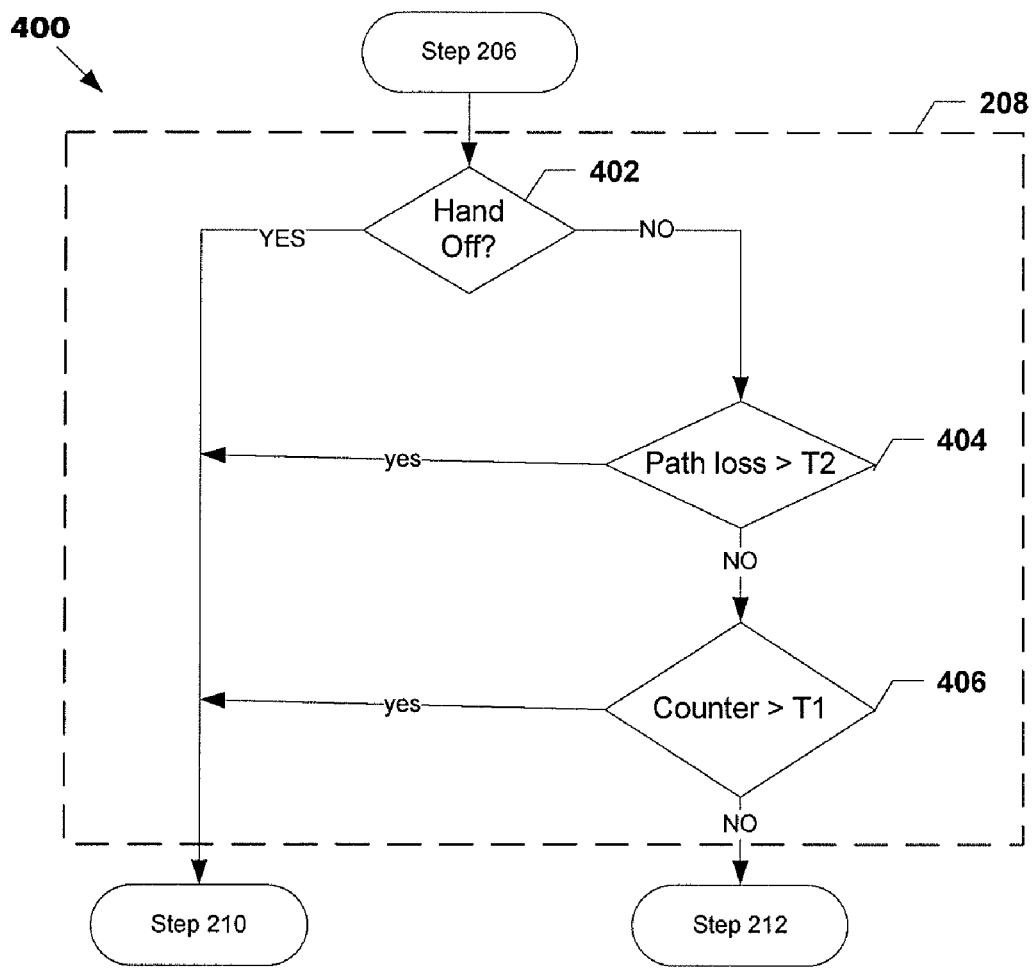
FIG. 4 is a flowchart depicting a method, according to embodiments of the present invention, of determining whether a sequence with a low power back-off metric is preferred.

Referring now to FIG. 4, FIG. 4 is a flow chart illustrating an exemplary process 400 for performing step 208. Process 400 may begin in step 402 where it is determined whether UE 104 is being handed off from one node to another node. If the UE is being handed off, then the method proceeds to step 210, which prefers sequences with low power back-off metrics. The reason that the method goes to step 210 during a hand off is because, when a UE is being handed off from one network node to another, it is normally on the edge of the node's transmission radius and, therefore, it is important to have a sequence with a low power back-off metric. If the UE is not being handed of (i.e., if it is just being turned on of has been in standby mode for an extended period of time), then the UE determines whether the measured path loss is greater than a certain pass loss threshold value (shown here as T2) at step 404. If the path loss is greater than the threshold, then the method advances to step 210. If, however, the path loss is less than the threshold value, then the method determines whether the counter incremented in step 220, which is indicative of the number of transmission attempts to the network node, is greater than a certain threshold T1 (step 406). If the counter is greater than T1, then the method advances to step 210. However, if the counter is below T1, then the method advances to step 212. The path loss threshold value T2 may be a configuration parameter stored in UE 104 prior to UE 104 performing process 200 and/or it may be communicated to UE 104 by a network node 102.

Figure 5:
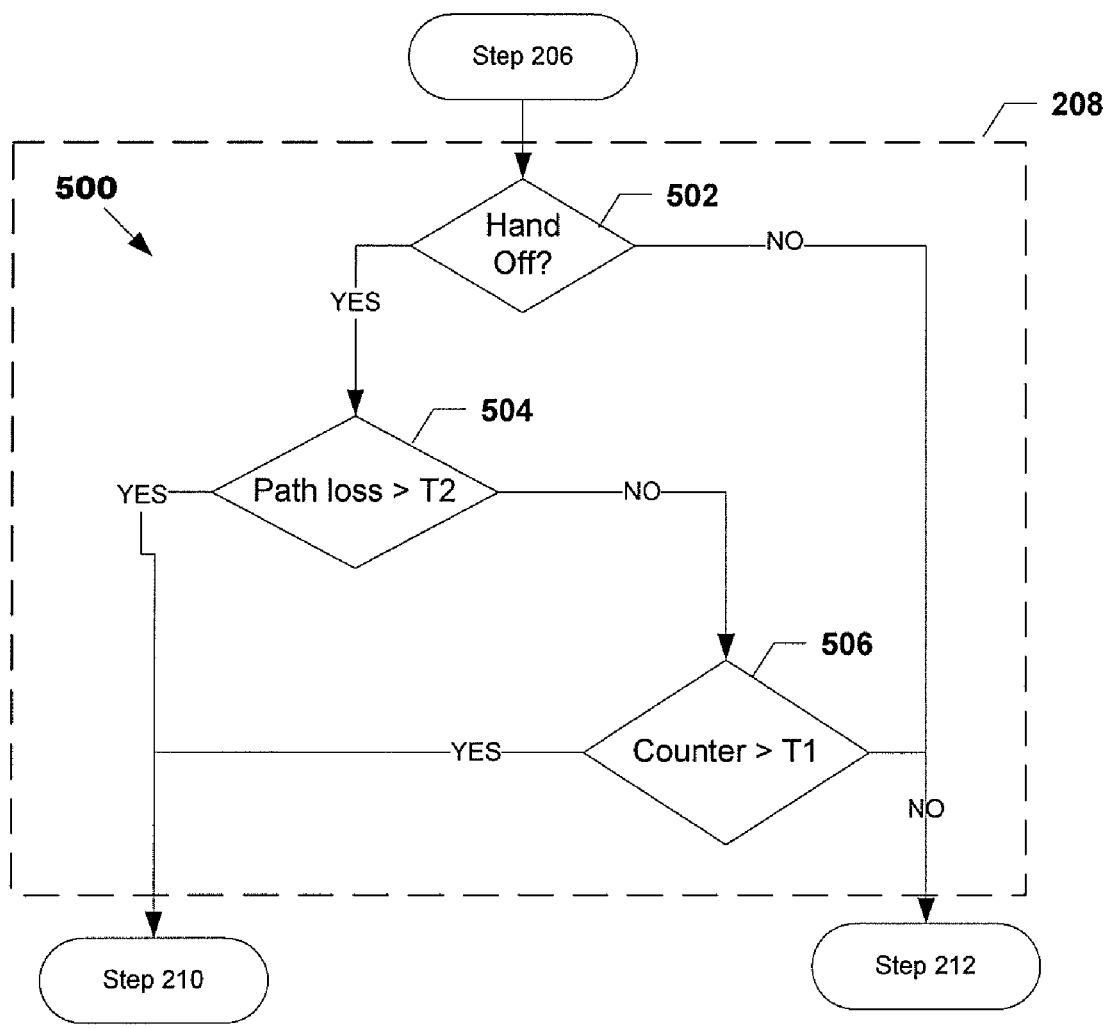
FIG. 5 is a flowchart depicting a method, according to embodiments of the present invention, of determining whether a sequence with a low power back-off metric is preferred.

Referring now to FIG. 5, FIG. 5 is a flow chart illustrating an exemplary process 500 for performing step 208. Process 500 may begin in step 502 where UE 104 determines whether its is being handed off or not. If it is, then the path loss is determined and if the path loss is greater than a certain threshold T2 as determined at step 504, then the method advances to step 210. If, however, the path loss is less than the threshold value, then the method determines whether the counter incremented in step 220 is greater than the threshold T1 (step 506). If the counter is greater than T1, then the method advances to step 210. However, if the counter is below T1, then the method advances to step 212.

Figure 6:
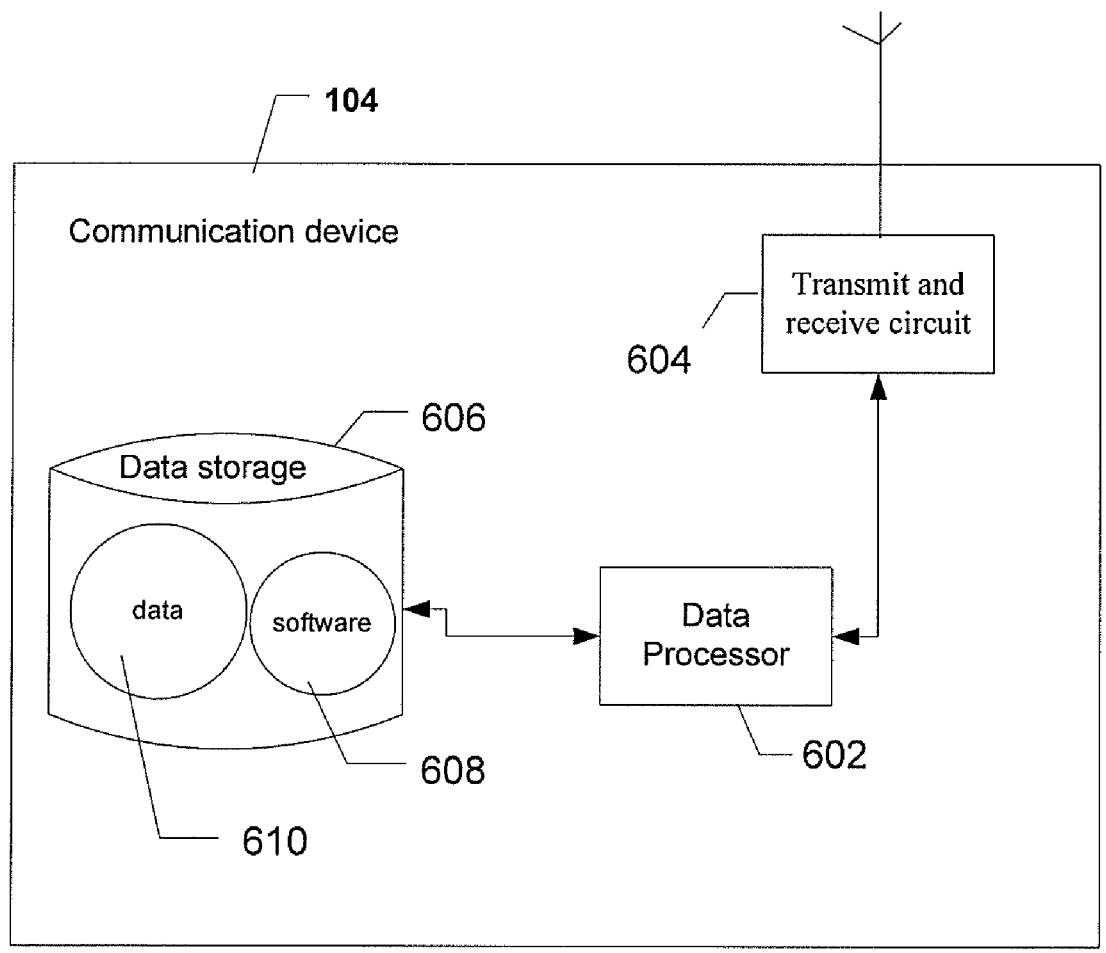
FIG. 6 schematically depicts a UE according to embodiments of the present invention.

Referring now to FIG. 6, FIG. 6 is a functional block diagram of UE 104 according to some embodiments of the invention. As shown, UE 104 may comprise a data processing system 602 (e.g., one or more microprocessors), a data storage system 606 (e.g., one or more non-volatile storage devices) and computer software 608 stored on the storage system 606. Data 610 (e.g., the above mentioned threshold values and root sequences) may also be stored in storage system 606. UE 104 also includes transmit/receive (Tx/Rx) circuitry 604 for transmitting data to and receiving data from network nodes 102.

Software 608 is configured such that when data processing system executes software 608, UE 104 performs steps described above (e.g., the steps described above with reference to the flow charts shown in FIGS. 2-5). For example, software 608 may include: (1) computer instructions configured to obtain sequence information for defining a set of sequences (root sequences or preambles) and (2) computer instructions configured to randomly select a sequence from the set of sequences using a non-uniform selection process such that the probability that a particular sequence is selected is a function of a power back-off metric associated with the particular sequence.

While various embodiments of the present invention have been described above, it should be understood that they have been presented by way of example only, and not limitation. Thus, the breadth and scope of the present invention should not be limited by any of the above described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. In a user equipment (UE) for use in a wireless network, a method of randomly accessing a network node, comprising:
   (A) receiving from the network node sequence information for defining a set of sequences, where each sequence in the set is associated with a power back-off metric;
   (B) selecting a sequence from the set of sequences; and
   (C) using the selected sequence or a sequence derived from the selected sequence to access the network node, wherein
   the step of selecting a sequence from the set of sequences comprises randomly selecting a sequence from the set of sequences using a non-uniform selection process such that the probability that a particular sequence is selected is a function of the power back-off metric associated with the particular sequence.

2. The method of claim 1, wherein the step of randomly selecting a sequence from the set of sequences using a non-uniform selection process is performed only if one or more certain events are detected, wherein the one or more certain events comprise: a path loss exceeding a threshold, the receipt of a hand off command, the UE being located at a cell edge, and/or the nth successive failure of a random access attempt, where n>1.

3. The method of claim 2, wherein the step of selecting a sequence from the set of sequences comprises randomly selecting a sequence from the set of sequences using a non-uniform selection process that favors certain sequences from the set of sequences, wherein each of said certain sequences is associated with a power back-off metric that is lower than an average or median power-back off metric for the set of sequences.

4. The method of claim 2, further comprising receiving a path loss threshold transmitted from a network node, wherein the one or more certain events comprises determining that a measured path loss exceeds the path loss threshold.

5. The method of claim 1, wherein the step of randomly selecting a sequence from the set of sequences using a non-uniform selection process comprises:
   forming a second set of sequences; and
   randomly selecting a sequence from only the second set of sequences, wherein
   the step of forming the second set of sequences comprises:
      for each sequence included in the first recited set of sequences, determining whether the sequence should be added to the second set of sequences, wherein the determination is based on, at least in part, the power back-off metric associated with the sequence, and
      adding the sequence to the second set of sequences in response to determining that the sequence should be added to the second set of sequences.

6. The method of claim 5, wherein
the step of determining whether the sequence should be added to the second set of sequences comprises determining whether the power back-off metric associated with the sequence is below a threshold, wherein if the power back-off metric associated with the sequence is below the threshold, then the sequence should be added to the second set of sequences such that the second set of sequences contains only those sequences that are associated with a power back-off metric that is relatively small.

7. The method of claim 5, wherein the step of randomly selecting a sequence from the second set of sequences is performed such that each sequence in the second set of sequences has an equal probability of being randomly selected.

8. The method of claim 1, wherein
the step of selecting a sequence from the set of sequences comprises randomly selecting a sequence from the set of sequences using a non-uniform selection process such that the probability that a particular sequence is selected is a function of (i) the power back-off metric associated with the particular sequence and (ii) a value representing an amount of path loss experienced by the UE such that if the value representing the amount of path loss experienced by the UE is greater than a threshold the non-uniform selection process favors certain sequences from the set of sequences, and if the value representing the amount of path loss experienced by the UE is less than a threshold the non-uniform selection process favors other sequences from the set of sequences wherein each other sequence is associated with a power back-off metric that is higher than the average or median power back-off metric of said certain sequences.

9. The method of claim 1, wherein
the power back-off metric is one of a cubic metric, a peak to average power ratio, or an out of band emission related metric, and
the step of using the selected sequence or the sequence derived from the selected sequence to access the network node comprises transmitting to the network node the selected sequence or a preamble derived from the selected sequence.

10. The method of claim 1, wherein
the sequence information for defining a set of sequences comprises a sequence index and a cyclic shift length, and
the sequence index is specific to a set of one or more network nodes of which said network node is a member.

11. The method of claim 1, wherein the set of sequences is a set of root sequences, and the UE stores a set of power back-off metrics, wherein each power back-off metric is associated with a root sequence.

12. A communication device, comprising:
   a receiver operable to receive sequence information;
   a data processing system configured to define a set of sequences, where each sequence in the set is associated with a power back-off metric, and select a sequence from the set of sequences; and
   a transmitter operable to transmit to a network node the selected sequence or a sequence derived from the selected sequence, wherein
   the data processing system is operable to randomly select a sequence from the set of sequences using a non-uniform selection process such that the probability that a particular sequence is selected is a function of the power back-off metric associated with the particular sequence.

13. The communication device of claim 12, wherein
the data processing system is configured to randomly select a sequence from the set of sequences using a non-uniform selection process only if the data processing system detects one or more certain events, and the data processing system is configured to randomly select a sequence from the set of sequences using a uniform selection process if the data processing system does not detect the one or more certain events.

14. The communication device of claim 13, wherein the one or more certain events comprise: a path loss exceeding a threshold, the receipt of a hand off command, the UE being located at a cell edge, and/or the nth successive failure of a random access attempt, where n>1.

15. The communication device of claim 12, wherein the non-uniform selection process favors certain sequences from the set of sequences, wherein each of said certain sequences is associated with a power back-off metric that is lower than an average or median power-back off metric for the set of sequences.

16. The communication device of claim 12, wherein the data processing system is configured to randomly select a sequence from the set of sequences using a non-uniform selection process by:
   forming a second set of sequences; and
   randomly selecting a sequence from only the second set of sequences, wherein the data processing system is configured to form the second set of sequences by:
      for each sequence included in the first recited set of sequences, determining whether the sequence should be added to the second set of sequences, wherein the determination is based on, at least in part, the power back-off metric associated with the sequence, and
      adding the sequence to the second set of sequences in response to determining that the sequence should be added to the second set of sequences.

17. The communication device of claim 16, wherein the data processing system is configured to determine whether the sequence should be added to the second set of sequences by determining whether the power back-off metric associated with the sequence is below a threshold, wherein if the power back-off metric associated with the root sequence is below the threshold, then the sequence should be added to the second set of sequences such that the second set of sequences contains only those sequences that are associated with a power back-off metric that is relatively small.

18. The communication device of claim 17, wherein the data processing system is configured to randomly select a sequence from the second set of sequences such that each sequence in the second set of sequences has an equal probability of being randomly selected.

19. The communication device of claim 12, wherein data processing system is configured such that the probability that a particular sequence is selected is a function of (i) the power back-off metric associated with the particular sequence and (ii) a value representing an amount of path loss such that if the value representing the amount of path loss experienced by the communication device is greater than a threshold the non-uniform selection process favors certain sequences from the set of sequences, and if the value representing the amount of path loss experienced by the communication device is less than a threshold the non-uniform selection process favors other sequences from the set of sequences wherein each other sequence is associated with a power back-off metric that is higher than the average or median power back-off metric of said certain sequences.

20. The communication device of claim 12, wherein the power back-off metric is one of a cubic metric, a peak to average power ratio, or an out of band emission related metric.

21. The communication device of claim 12, wherein the sequence information comprises a sequence index and a cyclic shift length, and
   the sequence index is specific to a set of one or more network nodes of which said network node is a member.

22. The communication device of claim 12, wherein the sequence is a root sequence and the sequence derived from the root sequence is a preamble.

23. The communication device of claim 12, wherein the set of sequences is a set of root sequences, and the communication device comprise a data storage system storing a set of power back-off metrics, wherein each power back-off metric is associated with a root sequence.

* * * * *